United States Patent
Yan

(10) Patent No.: US 6,716,506 B2
(45) Date of Patent: Apr. 6, 2004

(54) RECORDABLE HIGH-DENSITY OPTICAL RECORDING MEDIA

(75) Inventor: Guang Fu Yan, Hsinchu (TW)

(73) Assignee: Gigastorage Corporation, Hsinchu (TW)

( * ) Notice: Subject to any disclaimer, the term of this patent is extended or adjusted under 35 U.S.C. 154(b) by 43 days.

(21) Appl. No.: 09/994,876

(22) Filed: Nov. 28, 2001

(65) Prior Publication Data

US 2002/0071928 A1 Jun. 13, 2002

(51) Int. Cl.$^7$ .................................................. B32B 3/02
(52) U.S. Cl. .................... 428/64.1; 428/64.4; 428/64.8; 430/270.2
(58) Field of Search ............................. 428/64.1, 64.4, 428/64.8, 913; 430/270.14, 270.18, 270.19, 270.2, 495.1, 945

(56) References Cited

U.S. PATENT DOCUMENTS

| | | | | |
|---|---|---|---|---|
| 5,976,658 A | * | 11/1999 | Tomizawa | 428/64.1 |
| 6,218,072 B1 | * | 4/2001 | Otaguro | 430/270.1 |
| 2002/0048646 A1 | * | 4/2002 | Tomura | 428/64.4 |

* cited by examiner

Primary Examiner—Elizabeth Mulvaney
(74) Attorney, Agent, or Firm—Bacon & Thomas, PLLC

(57) ABSTRACT

A recordable optical recording medium, particularly a recordable high-density optical recording medium is disclosed. The optical recording medium comprises a substrate and a recording layer formed on said substrate, wherein said recording layer contains at least one laser beam absorbing dyes of formula (I):

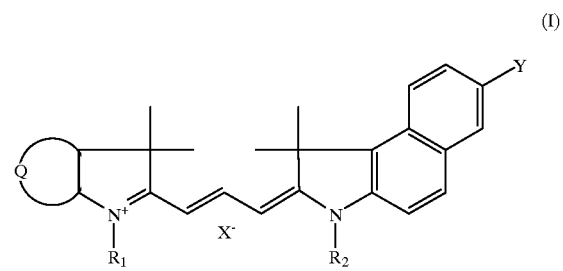

wherein

Q is phenyl or naphthyl substituted by $C_{1-4}$alkoxy;

$R_1$ and $R_2$, independently of each other, are $C_{1-8}$alkyl;

Y is hydrogen or $C_{1-4}$alkoxy; and $X^-$ is an anion.

4 Claims, No Drawings

RECORDABLE HIGH-DENSITY OPTICAL RECORDING MEDIA

FIELD OF THE INVENTION

The present invention relates to an optical recording medium, particularly to a high-density recordable optical recording medium.

BACKGROUND OF THE INVENTION

At present, the organic materials suitable for the recording layer of recordable compact disks (often referred to as CD-R) are mainly classified into three categories: cyanine dyes, phthalocyanine dyes and azo dyes. These dyes commonly have a maximal absorption at a wavelength of 650 nm to 750 nm in the visible light range. As a major function, the dyes absorb a laser beam of 780 nm and then convert it into thermal energy, such that the recording layer changes in its optical characteristics to fulfil the reflectance requirements as set forth in the specification of the compact disk (Red Book). In view thereof, therefore, an organic material having a light absorption at a wavelength outside the wavelength range of the laser beam is needed for the recording layer of the optical recording media. Since 1990s, in order to satisfy the tendency of continued data expansion, all the major CD manufacturers make efforts at the improvements of the recording density of the CDs by decreasing the spaces between the pits and between the tracks and, in the meantime, narrowing the laser beams for reading signal, to avoid the signal cross-talk between the tracks and to raise the discriminated ratio of track length. As a result, almost all the current developments are concentrated at the laser beams with wavelengths of 650 nm and 635 nm. According to experiences, if the laser beams of 650 nm and 635 nm is to be used, the organic recording layer of the recordable optical recording media preferably has a light absorption at a wavelength between 530 nm and 600 nm.

JP 2640219 (issued to Electronic Chemical Industry Enterprise Corporation, Tokyo, Japan) discloses using cyanine dyes in optical recording media. However, due to the limitation of the chemical structures of the dyes, the optical recording medium disclosed therein is only a low-density recording medium suitable for a writing and reading system with a laser beam of 780 nm.

Therefore, the objective of the present invention is to provide a high-density recordable optical recording medium, which is suitable for writing and reading systems with laser beams of 650 nm and 635 nm.

DETAILED DESCRIPTION OF THE INVENTION

To achieve the above objective, the recordable high-density optical recording medium according to the invention essentially comprises a substrate and a recording layer formed on said substrate, wherein said recording layer contains at least one laser beam absorbing dyes of the formula (I)

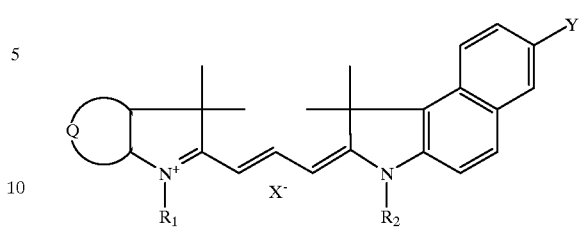

(I)

wherein Q is phenyl or naphthyl substituted with $C_{1-4}$alkoxy; $R_1$ and $R_2$, independently of each other, are $C_{1-8}$alkyl; Y is hydrogen or $C_{1-4}$alkoxy; and $X^-$ is an anion.

For the purpose of the invention, the recording layer preferably contains the laser beam absorbing dyes of the formula (I), wherein $R_1$ is methyl, ethyl, propyl or butyl; $R_2$ is methyl, ethyl, propyl or butyl; Y is hydrogen or methoxy; and $X^-$ is a perchlorate ion or hexafluorophosphate ion.

Preferably, the recording layer of the recordable high-density optical recording media according to the invention contains the laser beam absorbing dye of the formula (I), wherein Q is naphthyl substituted with methoxy; $R_1$ is methyl, ethyl, propyl or butyl; $R_2$ is methyl, ethyl, propyl or butyl; Y is methoxy; and $X^-$ is a perchlorate ion.

More preferably, the recording layer of the recordable high-density optical recording media according to the invention contains the laser beam absorbing dye of the formula (I), wherein Q is phenyl; $R_1$ is methyl, ethyl, propyl or butyl; $R_2$ is butyl; Y is hydrogen; and $X^-$ is a hexafluorophosphate ion.

Particularly preferably, the recording layer of the recordable high-density optical recording media according to the invention contains the laser beam absorbing dyes selected from the following compounds or the combinations thereof:

2-(3'-(1", 3", 3"-trimethyl-6"-methoxy-benzo[e]indole)-propenyl)-1,3,3-trimethyl-6-methoxy-benzo[e]indole perchlorate;

2-(3'-(1"-ethyl-3", 3"-dimethyl-6"-methoxy-benzo[e]indole)-propenyl)-1-ethyl -3,3-dimethyl-6-methoxy-benzo[e]indole perchlorate;

2-(3'-(1"-propyl-3", 3"-dimethyl-6"-methoxy-benzo[e]indole)-propenyl)-1-ethyl-3,3-dimethyl-6-methoxy-benzo[e]indole perchlorate;

2-(3'-(1"-butyl-3", 3"-dimethyl-6"-methoxy-benzo[e]indole)-propenyl)-1-butyl-3,3-dimethyl-6-methoxy-benzo[e]indole perchlorate;

2-(3'-(1", 3", 3"-trimethylindole)-propenyl)-1-butyl-3,3-dimethyl-benzo[e]indole hexafluorophosphate;

2-(3'-(1"-ethyl-3", 3"-dimethylindole)-propenyl)-1-butyl-3,3-dimethyl-benzo[e]indole hexafluorophosphate;

2-(3'-(1"-propyl-3", 3"-dimethylindole)-propenyl)-1-butyl-3,3-dimethyl-benzo[e]indole hexafluorophosphate; and 2-(3'-(1"-butyl-3", 3"-dimethylindole)-propenyl)-1-butyl-3,3-dimethyl-benzo[e]indole hexafluorophosphate.

The present invention is now described in more detail with reference to the following examples.

EXAMPLE 1

A round polycarbonate substrate having an outer diameter of 120 mm, an inner diameter of 15 mm, a thickness of 0.6 mm and a continuous spiral groove having a depth of 170 nm, a half-height width of 350 nm, a bottom width of 250 nm and a pitch of 740 nm is produced by an injection molding machine. At a temperature of 25° C. and a relative humidity of 50%, 1 ml of a 1.2% (by weight) solution of 2-(3'-(1",3",3"-trimethyl-6"methoxy-benzo[e]indole perchlorate (cyanine dye) in 2,2,3,3-tetrafluoropropanol is added dropwise to the substrate at its inner periphery. In the meantime, the substrate is spinned at a rate of 500 rpm for 2 seconds, and then at 1000, 2000 and 3000 rpm in turn for 3 seconds, to obtain a uniform dye layer. The thus coated substrate is then baked at 60° C. for 20 minutes and a uniform and dried optical recording layer is formed.

Next, the recording layer is formed with an about 100 nm gold film as a reflective layer by a sputtering machine. The reflective layer is then spin-on coated with about 3000 to 4000 nm of UV-curable acrylic resin (U.V. lacquer). The resultant layer cured with UV acts as a protective layer. The protective layer is then printed with a layer of adhesive by screen printing, on which a transparent annular polycarbonate substrate having no grooves, a thickness of 0.6 mm and an outer diameter of 120 mm is attached, thereby obtaining a recordable optical recording medium with a thickness of 1.2 mm and an outer diameter of 120 mm.

Write the modulation signal which meets the data format of 4.7 giga-bytes bytes DVD by using a high-density dynamic optical disk tester DDU-1000 D5/S having 635 nm wavelength as writing and reproducing light source at a laser power of 10 mW, then test characteristics of the written signal. With the same method described above, increase the laser power by 0.5 mw each time, and then test the characteristics of the written signal at different sections of the disk. With the above method, test and calculate the average and standard deviation value of 5 recording media. The results are shown in Table 1.

EXAMPLE 2

Except that 2-(3'-(1"-ethyl-3", 3"-dimethyl-6"-methoxy-benzo[e]indole)-propenyl)-1-ethyl-3,3-dimethyl-6-methoxy-benzo[e]indole perchlorate is used in place of the dye used in Example 1, all the procedures and tests of Example 1 are repeated. The results are shown in Table 2.

EXAMPLE 3

Except that 2-(3'-(1"-propyl-3", 3"-dimethyl-6"-methoxy-benzo[e]indole)-propenyl)-1-ethyl-3,3-dimethyl-6-methoxy-benzo[e]indole perchlorate is used in place of the dye used in Example 1, all the procedures and tests of Example 1 are repeated. The results are shown in Table 2.

EXAMPLE 4

Except that 2-(3'-(1"-butyl-3", 3"-dimethyl-6"-methoxy-benzo[e]indole)-propenyl)-1-butyl-3,3-dimethyl-6-methoxy-benzo[e]indole perchlorate is used in place of the dye used in Example 1, all the procedures and tests of Example 1 are repeated. The results are shown in Table 2.

EXAMPLE 5

Except that 2-(3'-(1",3", 3"-trimethylindole)-propenyl)-1-butyl-3,3-dimethyl-benzo[e]indole hexafluorophosphate is used in place of the dye used in Example 1, all the procedures and tests of Example 1 are repeated. The results are shown in Table 3.

EXAMPLE 6

Except that 2-(3'-(1"-ethyl-3", 3"-dimethylindole)-propenyl)-1-butyl-3,3-dimethyl-benzo[e]indole hexafluorophosphate is used in plece of the dye used in Example 1, all the procedures and tests of Example 1 are repeated. The results are shown in Table 4.

EXAMPLE 7

Except that 2-(3'-(1"-propyl-3", 3"-dimethylindole)-propenyl)-1-butyl-3,3-dimethyl-benzo[e]indole hexafluorophosphate is used in place of the dye used in Example 1, all the procedures and tests of Example 1 are repeated. The results are shown in Table 4.

EXAMPLE 8

Except that 2-(3'-(1"-butyl-3", 3"-dimethylindole)-propenyl)-1-butyl-3,3-dimethyl-benzo[e]indole hexafluorophosphate is used in place of the dye used in Example 1, all the procedures and tests of Example 1 are repeated. The results are shown in Table 4.

TABLE 1

| Recording power | Jitter(%) | Ref(%) | $I_{14}/I_{14H}$ | $I_3/I_{14H}$ | PPb | PPr | RC |
|---|---|---|---|---|---|---|---|
| 10.0 mw | 8.5 ± 0.2 | 46 ± 1 | 0.53 ± 0.01 | 0.20 ± 0.01 | 0.247 ± 0.003 | 0.60 ± 0.02 | 0.076 ± 0.001 |
| 10.5 mw | 7.6 ± 0.2 | 45 ± 1 | 0.59 ± 0.01 | 0.26 ± 0.01 | 0.255 ± 0.003 | 0.63 ± 0.02 | 0.080 ± 0.001 |
| 11.0 mw | 7.5 ± 0.2 | 45 ± 1 | 0.62 ± 0.01 | 0.28 ± 0.01 | 0.280 ± 0.003 | 0.65 ± 0.02 | 0.083 ± 0.001 |
| 11.5 mw | 7.8 ± 0.2 | 43 ± 1 | 0.63 ± 0.01 | 0.26 ± 0.01 | 0.285 ± 0.003 | 0.64 ± 0.02 | 0.081 ± 0.001 |
| 12.0 mw | 8.2 ± 0.2 | 42 ± 1 | 0.62 ± 0.01 | 0.25 ± 0.01 | 0.275 ± 0.003 | 0.65 ± 0.02 | 0.080 ± 0.001 |
| 12.5 mw | 8.6 ± 0.2 | 42 ± 1 | 0.58 ± 0.01 | 0.25 ± 0.01 | 0.253 ± 0.003 | 0.62 ± 0.02 | 0.076 ± 0.001 |
| 13.0 mw | 9.5 ± 0.2 | 40 ± 1 | 0.55 ± 0.01 | 0.20 ± 0.01 | 0.245 ± 0.003 | 0.57 ± 0.02 | 0.064 ± 0.001 |
| Standards of the specification | 8% | 45–85% | >0.6 | >0.15 | 0.18–0.36 | 0.5–1.0 | >0.05 |

Note: Jitter: jitter value, Ref: reflectance, $I_3$: 3T intensity, $I_{14}$: 14T intensity, PPb: signal intensity of tracks before recording, PPr: push-pull ratio, RC: radial contrast

TABLE 2

| Example No. | Recording power | Jitter(%) | Ref(%) | $I_{14}/I_{14H}$ | $I_3/I_{14H}$ | PPb | PPr | RC |
|---|---|---|---|---|---|---|---|---|
| 1 | 11.0 mw | 7.9 ± 0.2 | 46 ± 1 | 0.62 ± 0.01 | 0.28 ± 0.01 | 0.260 ± 0.003 | 0.28 ± 0.02 | 0.083 ± 0.001 |
| 2 | 11.0 mw | 7.7 ± 0.2 | 46 ± 1 | 0.64 ± 0.01 | 0.28 ± 0.01 | 0.250 ± 0.003 | 0.66 ± 0.02 | 0.086 ± 0.001 |
| 3 | 10.5 mw | 7.9 ± 0.2 | 45 ± 1 | 0.64 ± 0.01 | 0.26 ± 0.01 | 0.270 ± 0.003 | 0.65 ± 0.02 | 0.085 ± 0.001 |
| 4 | 10.5 mw | 8.0 ± 0.2 | 45 ± 1 | 0.63 ± 0.01 | 0.25 ± 0.01 | 0.280 ± 0.003 | 0.68 ± 0.02 | 0.085 ± 0.001 |
| Standards of the specification | — | 8% | 45–85% | >0.6 | >0.15 | 0.18–0.36 | 0.5–1.0 | >0.05 |

TABLE 3

| Recording power | Jitter(%) | Ref(%) | $I_{14}/I_{14H}$ | $I_3/I_{14H}$ | PPb | PPr | RC |
|---|---|---|---|---|---|---|---|
| 10.0 mw | 9.6 ± 0.2 | 51 ± 1 | 0.52 ± 0.01 | 0.20 ± 0.01 | 0.224 ± 0.003 | 0.56 ± 0.02 | 0.071 ± 0.001 |
| 10.5 mw | 8.5 ± 0.2 | 51 ± 1 | 0.55 ± 0.01 | 0.22 ± 0.01 | 0.236 ± 0.003 | 0.60 ± 0.02 | 0.076 ± 0.001 |
| 11.0 mw | 7.6 ± 0.2 | 50 ± 1 | 0.62 ± 0.01 | 0.27 ± 0.01 | 0.245 ± 0.003 | 0.63 ± 0.02 | 0.080 ± 0.001 |
| 11.5 mw | 7.5 ± 0.2 | 51 ± 1 | 0.65 ± 0.01 | 0.27 ± 0.01 | 0.260 ± 0.003 | 0.65 ± 0.02 | 0.081 ± 0.001 |
| 12.0 mw | 7.8 ± 0.2 | 49 ± 1 | 0.64 ± 0.01 | 0.26 ± 0.01 | 0.258 ± 0.003 | 0.64 ± 0.02 | 0.081 ± 0.001 |
| 12.5 mw | 8.2 ± 0.2 | 47 ± 1 | 0.63 ± 0.01 | 0.26 ± 0.01 | 0.252 ± 0.003 | 0.65 ± 0.02 | 0.080 ± 0.001 |
| 13.0 mw | 8.6 ± 0.2 | 48 ± 1 | 0.59 ± 0.01 | 0.24 ± 0.01 | 0.243 ± 0.003 | 0.62 ± 0.02 | 0.076 ± 0.001 |
| Standards of the specification | 8% | 45–85% | >0.6 | >0.15 | 0.18–0.36 | 0.5–1.0 | >0.05 |

TABLE 4

| Example No. | Recording power | Jitter(%) | Ref(%) | $I_{14}/I_{14H}$ | $I_3/I_{14H}$ | PPb | PPr | RC |
|---|---|---|---|---|---|---|---|---|
| 5 | 11.5 mw | 7.5 ± 0.2 | 51 ± 1 | 0.65 ± 0.01 | 0.27 ± 0.01 | 0.260 ± 0.003 | 0.65 ± 0.02 | 0.081 ± 0.001 |
| 6 | 11.5 mw | 7.7 ± 0.2 | 51 ± 1 | 0.67 ± 0.01 | 0.28 ± 0.01 | 0.250 ± 0.003 | 0.64 ± 0.02 | 0.082 ± 0.001 |
| 7 | 11.0 mw | 7.4 ± 0.2 | 49 ± 1 | 0.67 ± 0.01 | 0.28 ± 0.01 | 0.270 ± 0.003 | 0.66 ± 0.02 | 0.081 ± 0.001 |
| 8 | 11.5 mw | 7.2 ± 0.2 | 50 ± 1 | 0.68 ± 0.01 | 0.28 ± 0.01 | 0.280 ± 0.003 | 0.65 ± 0.02 | 0.080 ± 0.001 |
| Standards of the specification | — | 8% | 45–85% | >0.6 | >0.15 | 0.18–0.36 | 0.5–1.0 | >0.05 |

Based on the test results listed in the above tables, it can be concluded that the cyanine dyes according to the present invention indeed can achieve the desired high-density effects for the optical recording media.

We claim:

1. A recordable high-density optical recording medium comprising a substrate and a recording layer formed on said substrate, wherein said recording layer contains at least one laser beam absorbing dyes of the formula (I):

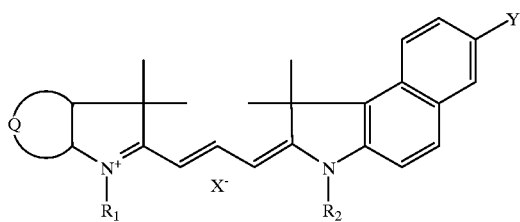

(I)

in which

Q is phenyl or naphthyl substituted with $C_{1-4}$alkoxy;

$R_1$ and $R_2$, independently of each other, are $C_{1-8}$alkyl;

Y is hydrogen or $C_{1-4}$alkoxy; and $X^-$ is a hexafluorophosphate or a perchlorate ion, provided that when Q is phenyl, Y is not hydrogen.

2. The recordable high-density optical recording medium of claim 1, wherein said recording layer contains the laser beam absorbing dye of the formula (I), wherein $R_1$ is methyl, ethyl, propyl or butyl; $R_2$ is methyl, ethyl, propyl or butyl; Y is hydrogen or methoxy; and $X^-$ is a perchlorate ion or a hexafluorophosphate ion.

3. The recordable high-density optical recording medium of claim 1, wherein said recording layer contains the laser beam absorbing dye of the formula (I), wherein Q is naphthyl substituted with methoxy; $R_1$ is methyl, ethyl, propyl or butyl; $R_2$ is methyl, ethyl, propyl or butyl; Y is methoxy; and $X^-$ is a perchlorate ion.

4. The recordable high-density optical recording medium of claim 1, wherein said recording layer contains the laser beam absorbing dye selected from the group consisting of:

2-(3'-(1",3",3"-trimethyl-6"-methoxy-benzo[e]indole)-propenyl)-1,3,3-trimethyl-6-methoxy-benzo[e]indole perchlorate;

2-(3'-(1"-ethyl-3",3"-dimethyl-6"-methoxy-benzo[e]indole)-propenyl)-1-ethyl-3,3demethyl-6methoxy-benzo[e]indole perchlorate;

2-(3'-(1"-propyl-3", 3"-dimethyl-6"-methoxy-benzo[e]indole)-propenyl)-1-ethyl-3,3dime thyl-6methoxy-benzo[e]indole perchlorate;

2-(3'-(1"-butyl-3", 3"-dimethyl-6"-methoxy-benzo[e]indole)-propenyl)-1-butyl-3,3dimethy-6methoxy-benzo[e]indole perchlorate; and mixtures thereof.

* * * * *

UNITED STATES PATENT AND TRADEMARK OFFICE
CERTIFICATE OF CORRECTION

PATENT NO. : 6,716,506 B2
DATED : April 6, 2004
INVENTOR(S) : Guang Fu Yan

It is certified that error appears in the above-identified patent and that said Letters Patent is hereby corrected as shown below:

<u>Column 6,</u>
Line 58, replace "3,3-demethyl-6methoxy-" with -- 3,3-dimethyl-6-methoxy- --;
Line 61, replace "3,3dime thyl-6methoxy-" with -- 3,3-dimethyl-6-methoxy- --;
Line 64, replace "3,3dimethy-6methoxy-" with -- 3,3-dimethyl-6-methoxy- --.

Signed and Sealed this

Second Day of May, 2006

JON W. DUDAS
*Director of the United States Patent and Trademark Office*